United States Patent
Li et al.

(10) Patent No.: US 9,869,840 B1
(45) Date of Patent: Jan. 16, 2018

(54) DISPOSABLE LENS APPLIED TO ELECTRONIC OPERATION DEVICE FOR RECOGNITION

(71) Applicants: Ming-Jui Li, Tainan (TW); Chia-Iun Tsai, Thousand Oaks, CA (US)

(72) Inventors: Ming-Jui Li, Tainan (TW); Chia-Iun Tsai, Thousand Oaks, CA (US)

( * ) Notice: Subject to any disclaimer, the term of this patent is extended or adjusted under 35 U.S.C. 154(b) by 0 days.

(21) Appl. No.: 15/193,917

(22) Filed: Jun. 27, 2016

(51) Int. Cl.
G02B 7/14 (2006.01)
G02B 13/00 (2006.01)
G02B 7/02 (2006.01)
H04N 5/225 (2006.01)
G06K 9/22 (2006.01)

(52) U.S. Cl.
CPC ............... *G02B 7/14* (2013.01); *G02B 7/025* (2013.01); *G02B 13/001* (2013.01); *G06K 9/228* (2013.01); *H04N 5/2254* (2013.01)

(58) Field of Classification Search
CPC ....... A61B 1/227; A61B 1/04; A61B 1/00108; A61B 1/00009; A61B 1/00045; A61B 3/12; A61B 5/0077; G02B 7/02; G02B 7/09; G02B 7/14; G02B 7/025; G02B 7/027; G02B 13/001; G02B 25/002; G02B 21/0008; G02B 21/18; G02B 21/32; G02B 21/34; G02B 21/36; G02B 21/361; G02B 21/362; G02B 21/368; G06K 9/228; H01L 27/14618; G03B 17/565; G03B 17/566; H04N 5/2254; H04N 5/2257; H04N 5/2252; H04N 5/2253; H04N 5/2251; H04M 1/0264; H04M 1/0249
See application file for complete search history.

(56) References Cited

U.S. PATENT DOCUMENTS

| | | | | |
|---|---|---|---|---|
| 8,073,324 B2 * | 12/2011 | Tsai | ...................... | H01F 7/0247 359/827 |
| 8,385,004 B2 * | 2/2013 | Hicks | ..................... | G03B 41/00 359/699 |
| 9,325,884 B2 * | 4/2016 | Fletcher | ................... | H04M 1/21 |
| 9,445,713 B2 * | 9/2016 | Douglas | ............. | A61B 1/00009 |
| 9,619,137 B2 * | 4/2017 | Lombardi | ............ | G06F 3/0488 |
| 9,661,200 B2 * | 5/2017 | O'Neill | ................ | H04N 5/2254 |
| 2004/0227848 A1 * | 11/2004 | Tan | ....................... | H01L 21/565 348/374 |

(Continued)

Primary Examiner — Michael Osinski
(74) Attorney, Agent, or Firm — Muncy, Geissler, Olds & Lowe, P.C.

(57) ABSTRACT

A disposable lens applied to electronic operation device for recognition includes a substrate, a lens and a fix adhesive. It is only necessary for the user to fix the disposable lens to the electronic operation device provided with an image-capturing unit and enable the image-capturing unit to align with a recognized unit to be recognized through the lens, such that the image of the recognized unit is expanded through the lens through optical properties. Thus, the image signal captured by the image-capturing unit is clearer, and then processed by the electronic operation device. Not only compactness with portability enabling the user to recognize the recognized unit immediately, but also the effect of low-priced material are provided due to simple structure of the disposable lens of the present invention. Thereby, relative advantages in volume, convenience and cost are all obtained.

9 Claims, 8 Drawing Sheets

(56) References Cited

U.S. PATENT DOCUMENTS

| | | | | |
|---|---|---|---|---|
| 2006/0091487 A1* | 5/2006 | Hanada | H01L 24/03 | 257/432 |
| 2006/0181633 A1* | 8/2006 | Seo | H04N 5/2251 | 348/340 |
| 2007/0236596 A1* | 10/2007 | Sekine | H04N 5/2253 | 348/340 |
| 2009/0093274 A1* | 4/2009 | Yamamoto | G03B 17/565 | 455/566 |
| 2009/0135297 A1* | 5/2009 | Wu | H04N 5/2253 | 348/374 |
| 2010/0165183 A1* | 7/2010 | Tian | H04N 5/2257 | 348/374 |
| 2011/0149143 A1* | 6/2011 | Tsujino | G02B 3/0031 | 348/374 |
| 2011/0216238 A1* | 9/2011 | Fujii | B05D 5/06 | 348/374 |
| 2011/0234803 A1* | 9/2011 | Nakajima | H04N 5/2254 | 348/148 |
| 2012/0068292 A1* | 3/2012 | Ikeda | G02B 13/006 | 257/432 |
| 2012/0133825 A1* | 5/2012 | Nakajima | H04N 5/2253 | 348/374 |
| 2012/0294602 A1* | 11/2012 | Sekine | H01L 27/14618 | 396/502 |
| 2012/0314126 A1* | 12/2012 | Liu | H01L 27/14618 | 348/374 |
| 2013/0114153 A1* | 5/2013 | Lu | H04N 5/2257 | 359/819 |
| 2013/0300919 A1* | 11/2013 | Fletcher | H04M 1/21 | 348/360 |
| 2014/0049818 A1* | 2/2014 | Schlaudraff | G02B 21/34 | 359/397 |
| 2014/0083600 A1* | 3/2014 | Yi | H04N 5/2253 | 156/182 |
| 2014/0118516 A1* | 5/2014 | Suzuki | H04N 5/2257 | 348/65 |
| 2014/0176792 A1* | 6/2014 | Cao | H04N 5/2257 | 348/376 |
| 2015/0065803 A1* | 3/2015 | Douglas | A61B 1/00009 | 600/200 |
| 2015/0244904 A1* | 8/2015 | Bone | H04N 5/2252 | 348/374 |
| 2016/0014313 A1* | 1/2016 | Muller | H04N 5/2253 | 348/294 |
| 2016/0147057 A1* | 5/2016 | Nagayama | G02B 21/0008 | 348/79 |
| 2016/0150133 A1* | 5/2016 | Suzuki | H04N 5/2252 | 348/376 |
| 2016/0248951 A1* | 8/2016 | Fletcher | H04M 1/21 | |
| 2016/0282580 A1* | 9/2016 | Koyama | G02B 7/08 | |
| 2016/0283079 A1* | 9/2016 | Lombardi | G06F 3/0488 | |
| 2016/0330375 A1* | 11/2016 | Sekimoto | G03B 5/00 | |
| 2017/0045723 A1* | 2/2017 | Lin | G02B 21/082 | |
| 2017/0045724 A1* | 2/2017 | Lin | G02B 21/082 | |
| 2017/0094038 A1* | 3/2017 | Chen | H04M 1/0264 | |
| 2017/0126943 A1* | 5/2017 | Fletcher | H04N 5/2254 | |
| 2017/0160509 A1* | 6/2017 | Wang | G02B 7/003 | |

* cited by examiner

DISPOSABLE LENS APPLIED TO ELECTRONIC OPERATION DEVICE FOR RECOGNITION

FIELD OF THE INVENTION

The present invention is related to an optical lens, particularly to a disposable lens applied to electronic operation device for recognition with portability and low cost.

BACKGROUND OF THE INVENTION

The conventional optical image expansion instrument applied to image expansion and then recognition is allowed for magnifying the image of a recognized unit through a microscope or a lens, followed by recognizing the recognized unit. Presently, the microscope or lens of the optical image expansion instrument sold on the market is manufactured by molding. Besides, other connecting components are more precise and complicated. As such, the manufacturing process is more overelaborate and production time is longer for the optical image expansion instrument, resulting in slightly higher cost of the optical image expansion instrument further.

In addition, the optical image expansion instrument is carried outdoors by the user inconveniently due to unduly large whole volume normally. Hence, there is a drawback of incapability to recognize the recognized unit immediately. To solve the problem of non-portability, the recognized unit is sampled and then preserved sealingly by the user. Afterwards, the recognized unit is recognized by the optical image expansion instrument indoors.

However, during sealing process and transportation process, the recognized unit may be affected by external environmental factors, such as sunlight irradiation, such that initial parameters of the recognized unit are changed. Probably, it is incapable of determining the authenticity of the recognized unit effectively and correctly, because the most authentic and correct data could not be obtained by the user.

Accordingly, there are a drawback of slightly higher cost due to complicated manufacturing process and a drawback of incapability to recognize the recognized unit immediately due to unduly large whole volume inherent in the conventional optical image expansion instrument. Consequently, the improvements should be required.

SUMMARY OF THE INVENTION

It is the object of the present invention to provide an optical structure which, combined with the electronic operation device and constructed simply so as to be compact, portable and inexpensive, is a disposable lens capable of being applied to the electronic operation device instantaneously to recognize a recognized unit immediately.

On the basis of the above-mentioned object, the present invention provides a disposable lens applied to electronic operation device for recognition, comprising a substrate, a lens and a fix adhesive. The lens is provided at one end of the substrate and corresponded to an image-capturing unit of an electronic operation device. The fix adhesive is connected with one side of the substrate, so as to fix the substrate to the electronic operation device.

The features of the present invention are as follows.

1. The disposable lens of the present invention is constructed simply, so as to provide the effect of compactness with portability, enabling the user to recognize the recognized unit immediately. Then, the drawback of bulkiness with non-portability resulting in incapability of instantaneous recognition of the conventional instrument is eliminated.
2. Different from the drawback of the conventional costly instrument in complicated manufacturing process and resulted higher cost, the lens of the disposable lens of the present invention is constructed simply and the manufacturing cost is then reduced. Thereby, relative advantages in volume, convenience and cost are all obtained.
3. Different from the conventional optical image expansion instrument being bulky and hard to preserve, the disposable lens of the present invention is formed in a lightweight portable and thin shape, without excessive conflict with preservation when it is used. As such, the user may not be bothered to much in any case.
4. In the present invention, the fix adhesive is provided to enable the customer to fix the disposable lens to the electronic operation device while align the lens with the image-capturing unit more conveniently and rapidly. Subsequently, a biochemical sheet or an anti-forgery structure may be then recognized. Thereby, the effect of facilitating prerequisite is achieved.

DETAILED DESCRIPTION OF THE PREFERRED EMBODIMENTS

Figure 1:
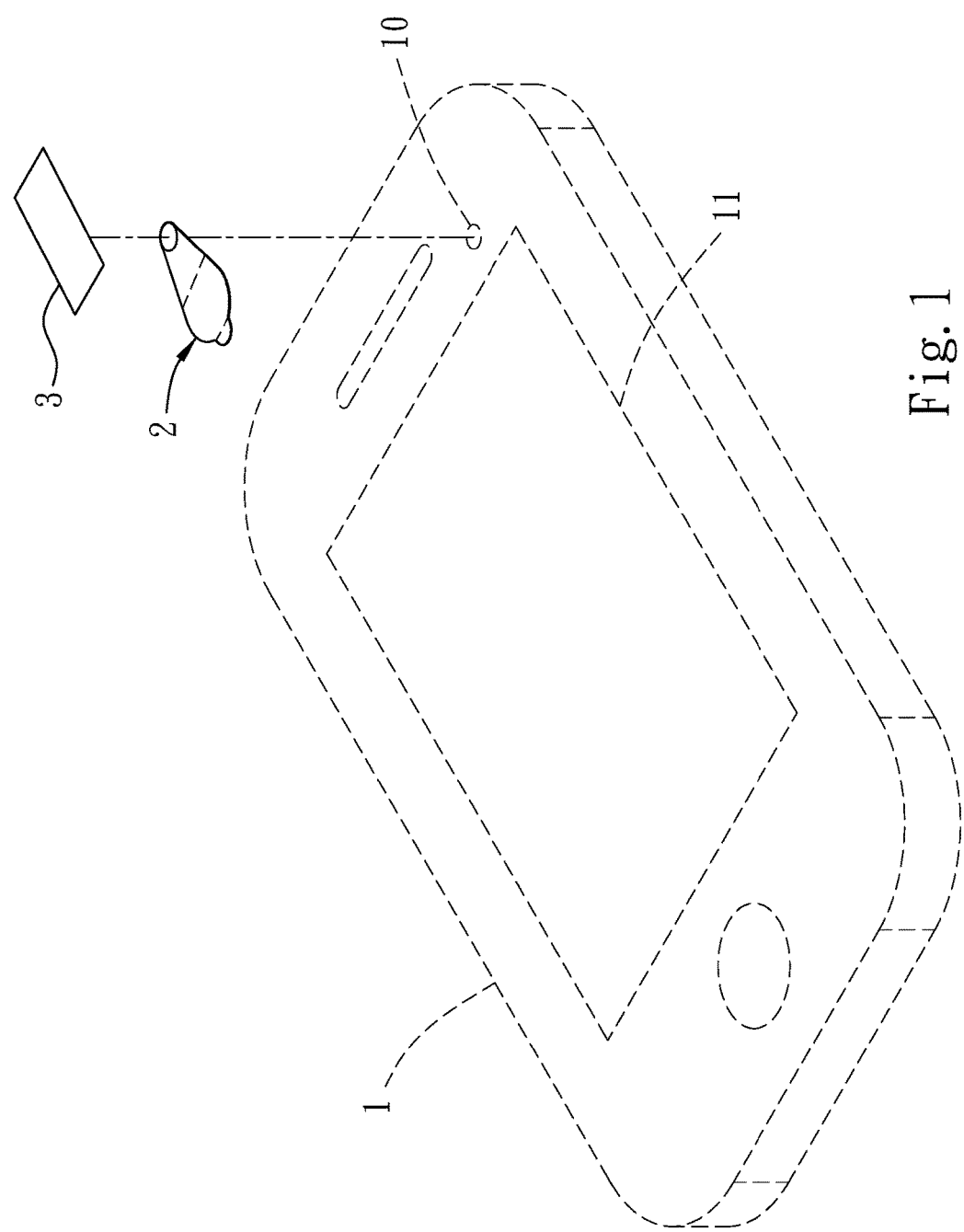
FIG. 1 is an exploded perspective view of the present invention.
Figure 2:
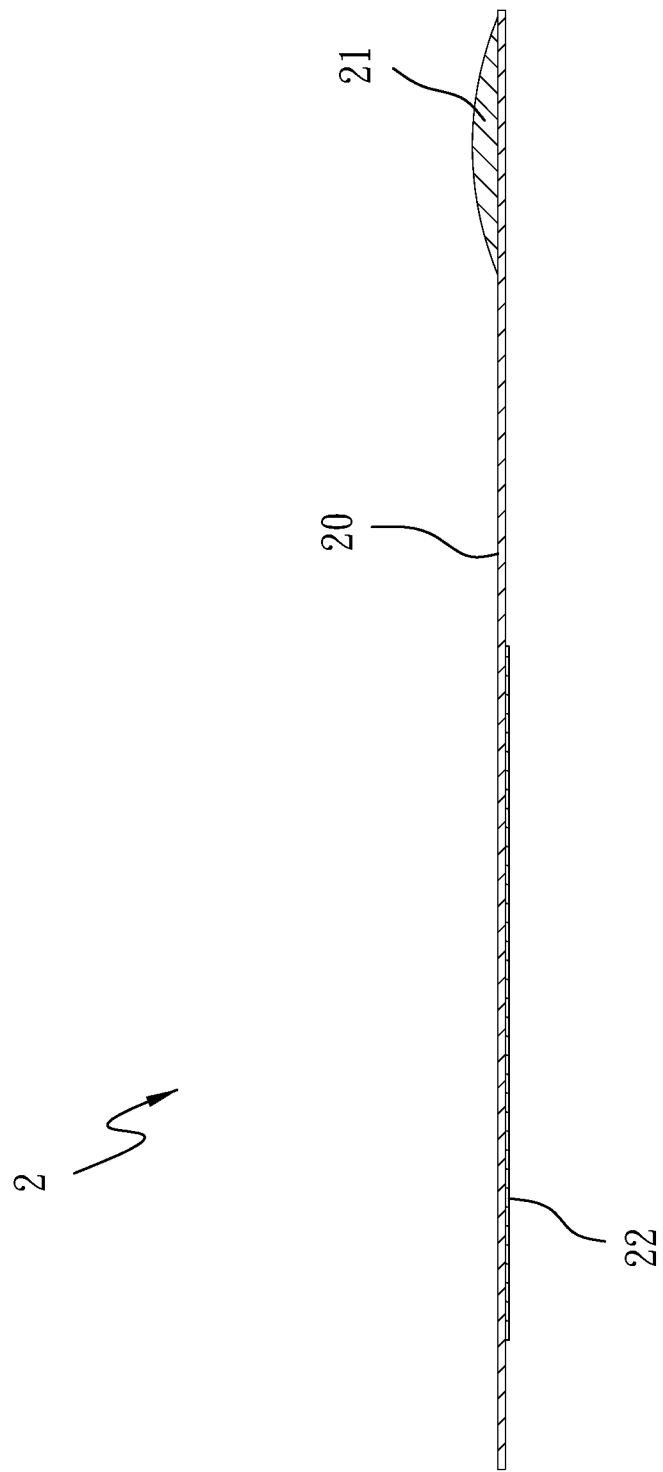
FIG. 2 is a plan view of a disposable lens of the present invention.
Figure 3:
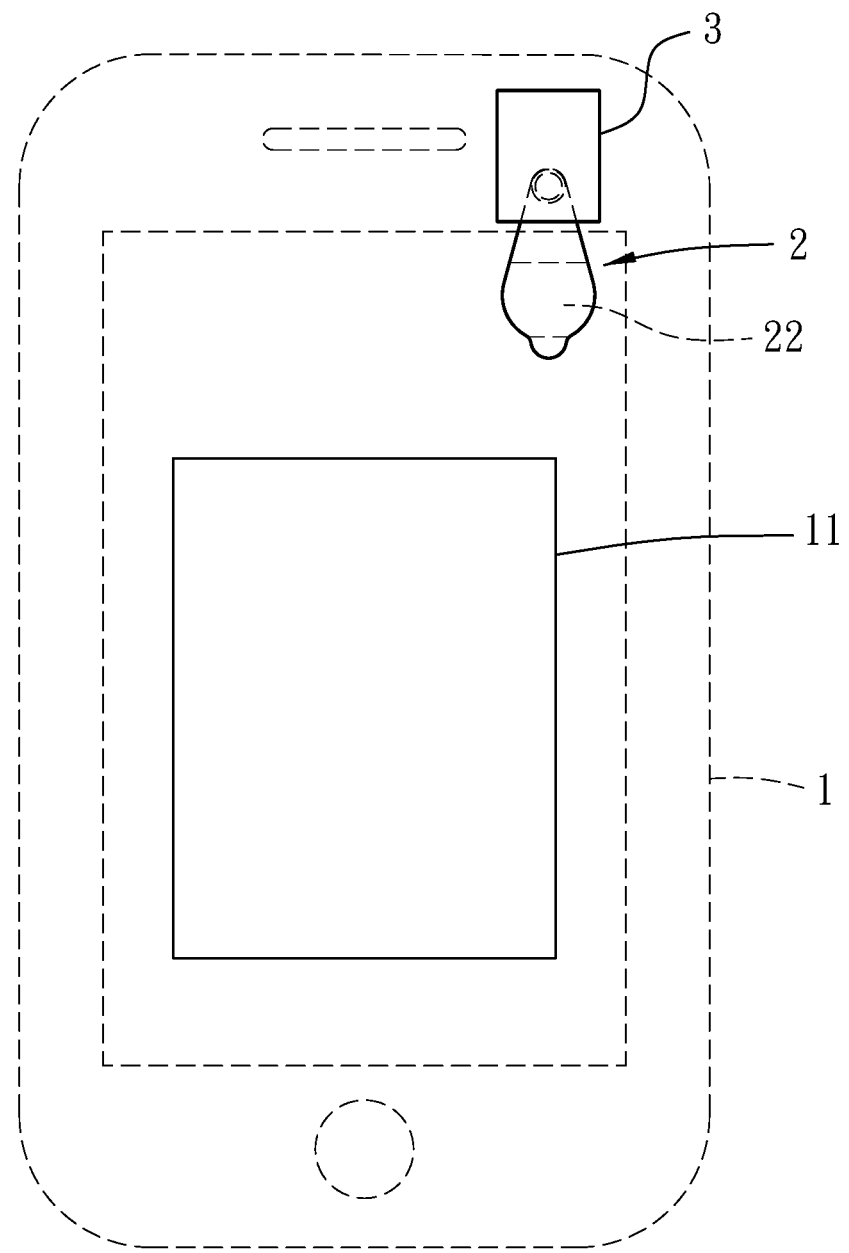
FIG. 3 is a plan view of a front-facing camera lens, a disposable lens and a recognized unit of an electronic operation device of the present invention.

Referring to FIGS. 1 to 3, there is shown a disposable lens applied to electronic operation device for recognition provided by the present invention. An assembled structure, combining a disposable lens 2 onto an electronic operation device 1 including an image-capturing unit 10, of the present invention may be used for the recognition of a recognized unit 3. The disposable lens 2 includes a substrate 20, a lens 21 and a fix adhesive 22. The lens 21 is provided at one end of the substrate 20, and corresponded to the image-capturing unit 10 of the electronic operation device 1. The fix adhesive 22 is connected with one side of the substrate 20, so as to fix the substrate 20 to the electronic operation device 1.

Figure 7:
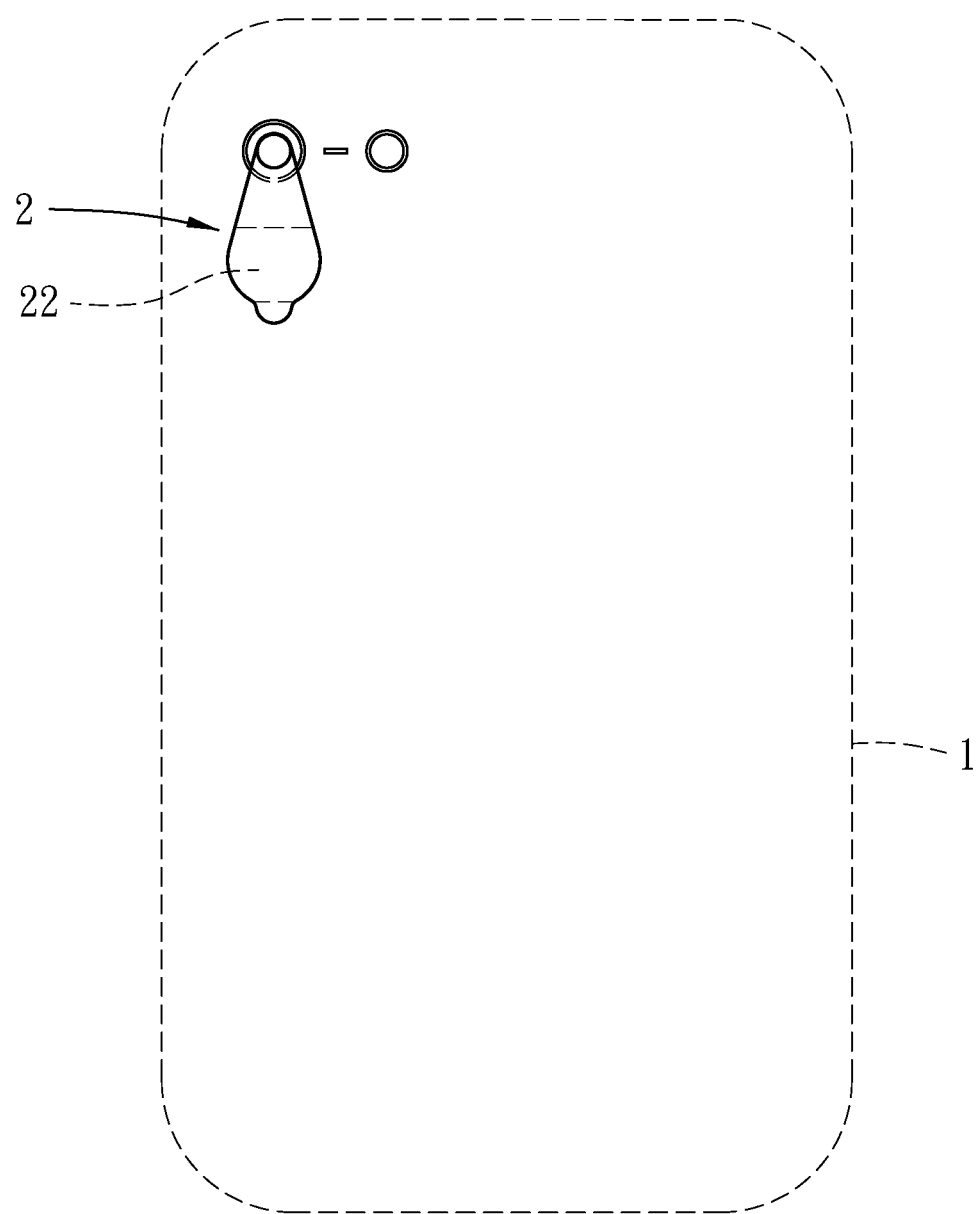
FIG. 7 is a plan view of a rear-facing camera lens, a disposable lens and a recognized unit of an electronic operation device of the present invention.

In one embodiment of the present invention, the lens 21 is provided at one side of the substrate 20 and aligned with the image-capturing unit 10, in such a way that the substrate 20 is provided between the image-capturing unit 10 and the lens 21. The exemplary embodiment will not limit the present invention, only if the recognized unit 3 may be aligned with the image-capturing unit 10 through the lens 21 such that the image of the recognized unit 3 displayed on a display unit 11 of the electronic operation device 1 is expanded. The image-capturing unit 10 may be implemented as a front-facing camera lens of the electronic operation device 1, or a rear-facing camera lens of the electronic operation device 1 illustrated in FIG. 7. Moreover, the substrate 20 in this present invention may be selectively implemented by a translucent or transparent plastic sheet, while the lens 21 may be selectively implemented by a cured polymer selected from epoxy resin, ultraviolet-cured adhesive, thermoplastic material and etc., so as to obtain the effect of low lost and mass-producibility.

Figure 8:
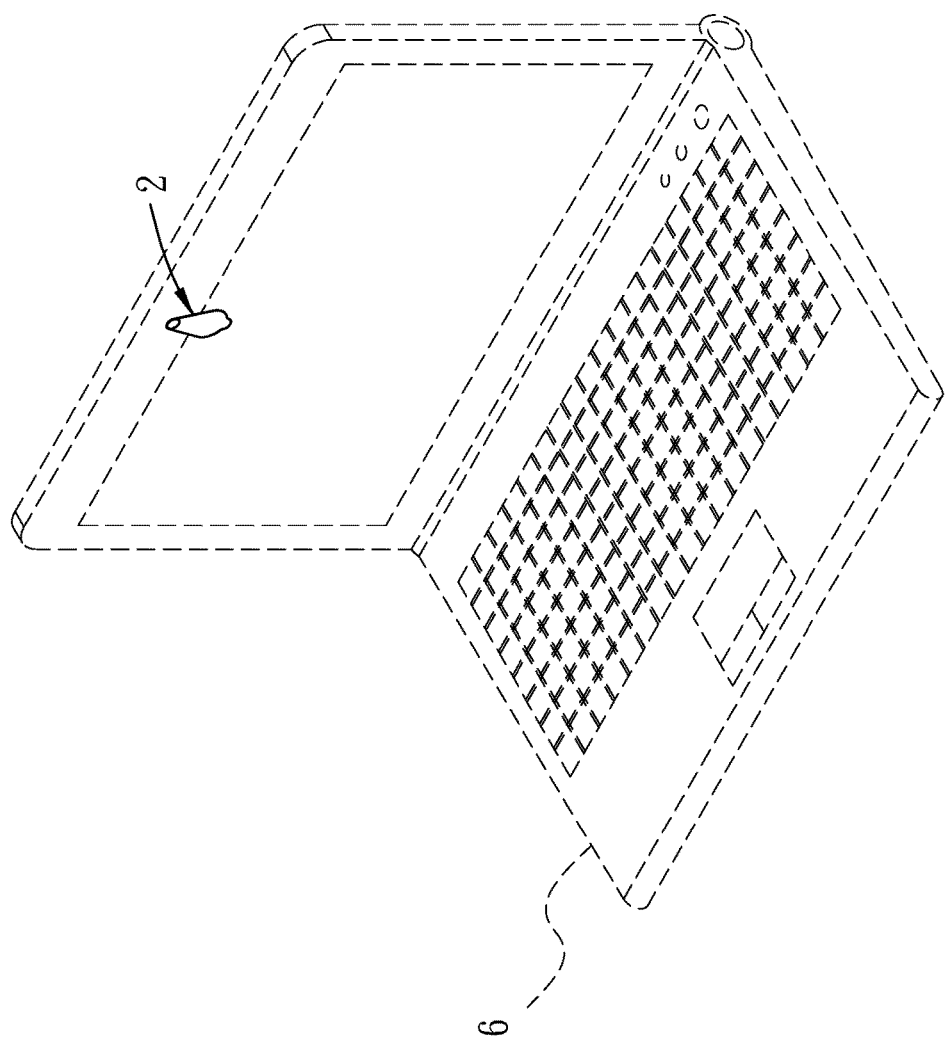
FIG. 8 is an assembled perspective view according to another embodiment of the present invention.

Then, the disposable lens 2 of the present invention is constructed simply, so as to provide the effect of compactness with portability, and then to be manipulated by the user conveniently at any time or in one-handed operation to recognize the recognized unit 3. Thereby, the drawback of bulkiness with non-portability resulting in incapability of instantaneous recognition of the conventional instrument is eliminated. The present invention is relatively advantageous in volume, convenience and cost. In the embodiment of the present invention, furthermore, the electronic operation device 1 may be implemented as a smart mobile device held by hand while provided with the image-capturing lens and operation function, and also possibly adapted to be the electronic operation device, such as a notebook 6 illustrated in FIG. 8 and the tablet computer, e.g., iPad, for example.

Figure 4:
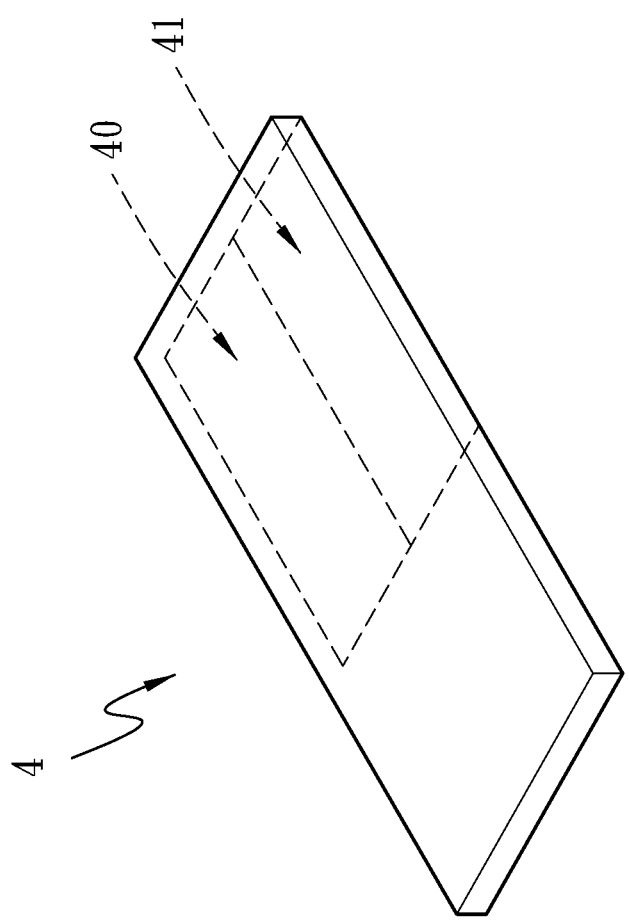
FIG. 4 is a perspective view of a biochemical sheet of the present invention.
Figure 5:
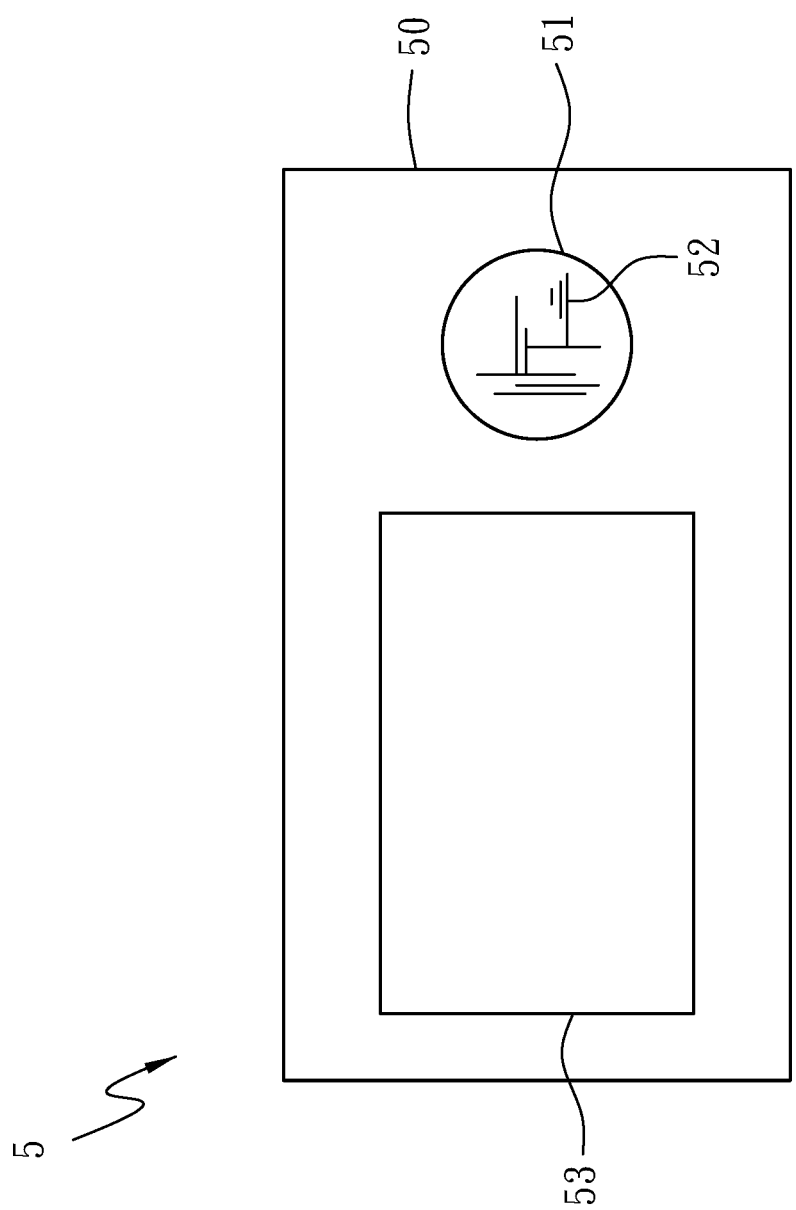
FIG. 5 is a plan view of an anti-forgery structure according to a first embodiment of the present invention.
Figure 6:
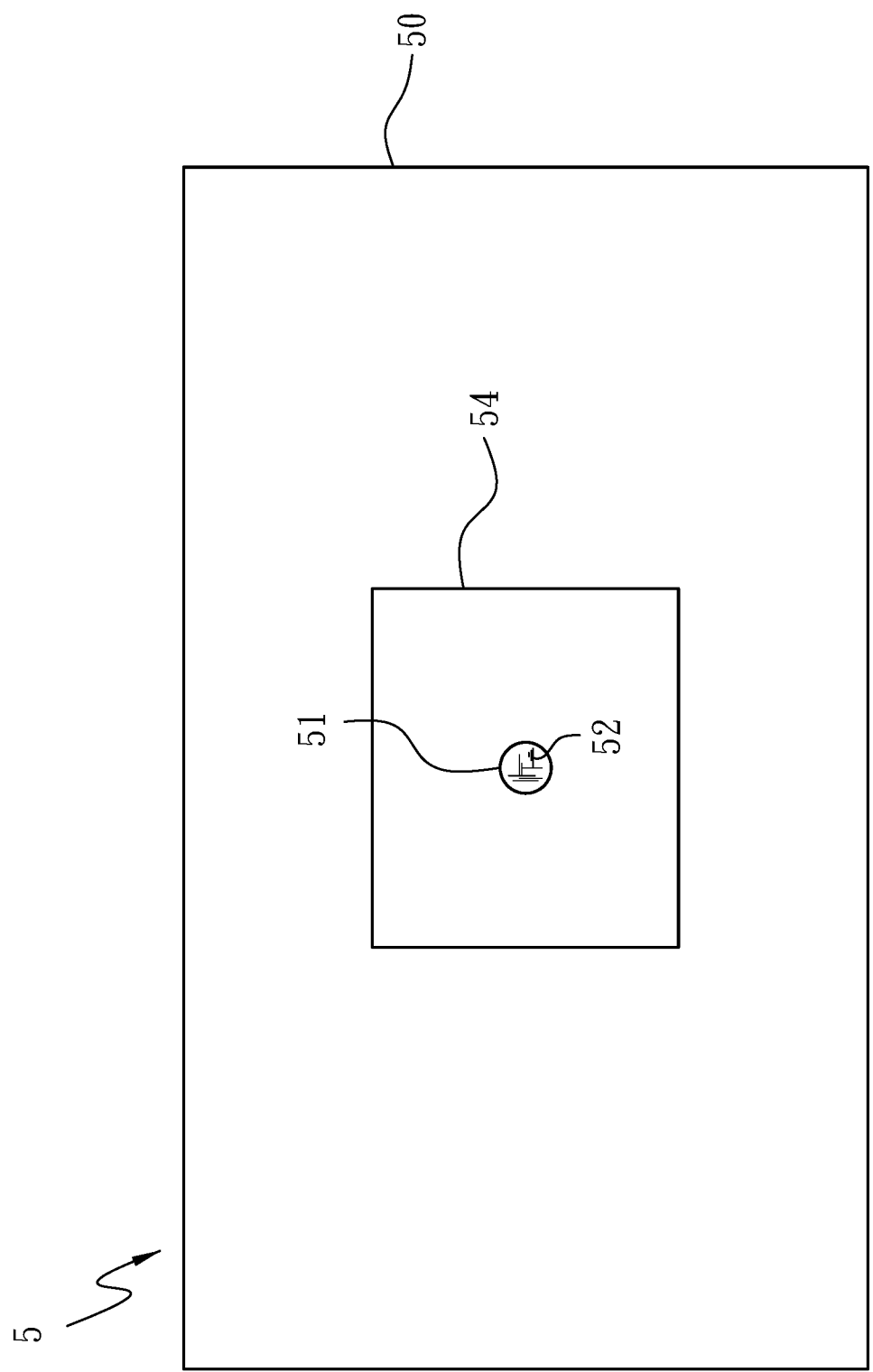
FIG. 6 is a plan view of an anti-forgery structure according to a second embodiment of the present invention.

Subsequently, referring to FIGS. 4 to 6, the recognized unit 3 may be implemented as a biochemical sheet 4 or an anti-forgery structure 5 in the practical use. In FIG. 4, firstly, one embodiment of the biochemical sheet 4 is described. The biochemical sheet 4 includes a test area 40 at one end of the biochemical sheet 4, and a calibration area 41 located at the one end of the biochemical sheet 4 and adjoined to the test area 40. During operation, a specimen to be identified is firstly added to the test area 40 of the biochemical sheet 4, such that the specimen to be identified is mixed with a biochemical reactant on the test area 40. Subsequently, the test area 40 and the calibration area 41 of the biochemical sheet 4 are aligned with the lens 21. For the test area 40 and the calibration area 41, therefore, the resulted test area 40 and the calibration area 41 are scanned by the image-capturing unit 10 and the image thereof is expanded through the lens 21 and the image-capturing unit 10. After that, the expanded image is displayed on the display unit 11. The comparison is then made by the user on the basis of difference between the magnified resulted test area and calibration area 41. The biochemical reactant on the test area 40 of the present invention may be implemented as metal contents or pH value of environment pollutants, or analyte (such as glucose, cholesterol, ketone body and specific proteins, for example) in biofluid, such as blood, urine and saliva, for example, of human body.

Next, to be more precisely, the calibration area 41 further includes at least one comparison object (not illustrated in figures). This comparison object is comparison data inserted into the calibration area 41 previously in accordance with the type of the specimen to be identified. Particularly, data, such as the corresponding comparison value or table, is inserted into the calibration area 41 as the standard for comparison, when the biochemical sheet 4 is desired to inspect environmental metal contents or pH value. Furthermore, the corresponding comparison data is similarly inserted into the calibration area 41 when physiological parameters, such as blood glucose in blood, urine and saliva, for example is inspected as desired, and so forth.

Referring to FIG. 4 again, the difference in performance between the test area 40 and the calibration area 41 may be recognized manually, or recognized by application programs automatically. In one embodiment, the electronic operation device 1 includes an application program (not illustrated in figures) electrically connected to the image-capturing unit 10, such that the comparison of difference between the resulted test area 40 and calibration area 41 may be determined by the application program automatically. The calibration may be even performed by the application program so as to enhance accuracy. The calibration area 41 further includes at least one focused target object (not illustrated in figures). The focused target object may be implemented as calibration object, such as thick/thin stripes, checks, object-positioning light sources, white balance and so on. In the electronic operation devices of different bands or models, the parameters, such as on-screen display, brightness, for example, or various settings for the image-capturing units (for instance, color temperature, white balance) are all not the same. Then, if non-autofocus mode is adopted for the image-capturing unit 10, accuracy may be possibly varied when the biochemical sheet 4 is captured by the image-capturing unit 10. Instead, the electronic operation device 1 may be allowed to control the image-capturing unit 10 to calibrate the biochemical sheet 4 through the application program through the provision of the focused target object. Thus, inspection accuracy may be raised.

Referring to FIGS. 5 and 6 again, there are shown embodiments for describing anti-forgery recognition of the recognized unit 3. When a product requiring anti-forgery identification is developed by a company, the anti-forgery structure 5 is adhered to the product, in such a way that authenticity of the product may be identified by the user on the basis of the anti-forgery structure 5 when the product is bought. The anti-forgery structure 5 includes a main body 50, a transparent colloid 51 provided at one end of the main body 50, and at least one micro-carving plate 52 provided within the transparent colloid 51. The micro-carving plate 52 is provided thereon with patterns, characters or numbers to be recognized. The transparent colloid 51 of the anti-forgery structure 5 is aligned with the lens 21 by the user. For the micro-carving plate 52, therefore, the micro-carving plate 52 is scanned by the image-capturing unit 10 and the image thereof is expanded through the lens 21 and the image-capturing unit 10. After that, the expanded image is displayed on the display unit 11 to be used by the user to verify authenticity of the product on the basis of the resulted image.

In one embodiment, referring to FIGS. 5 and 6 again, the micro-carving plate 52 may be replaced by a barcode. The anti-forgery structure 5 includes at least one one-dimensional barcode 53 or at least one two-dimensional barcode 54 implemented as quick response code (QR code). In the practical use, only selective one of or any combination of the micro-carving plate 52, one-dimensional barcode 53 and two-dimensional barcode 54 may be used, and further, the combined use thereof is exemplified in the embodiment of the present invention. In the combination type, dual confirmation on whether the product is a counterfeit may be achieved. The one-dimensional barcode 53 or the two-dimensional barcode 54 may be provided in vicinity of the micro-carving plate 52, or the micro-carving plate 52 may be provided in the one-dimensional barcode 53 or the two-dimensional barcode 54. The micro-carving plate 52 in the embodiment of the present invention illustrated in FIG. 5 is provided in the vicinity of the one-dimensional barcode 53, while the micro-carving plate 52 in the embodiment of the present invention illustrated in FIG. 6 is provided in the two-dimensional barcode 54.

More specifically, the micro-carving plate 52, the one-dimensional barcode 53 or the two-dimensional barcode 54 may be magnified by the image-capturing unit 10 to be recognized by the customer manually. Accurate determination on authenticity of the product may be achieved through multiple sets of anti-forgery objects. The application program may be even used for the automatic recognition of the micro-carving plate 52, one-dimensional barcode 53 or two-dimensional barcode 54, so as to reduce human error in determination.

In addition, the one-dimensional barcode 53 or the two-dimensional barcode 54 may be also used as authentication of the product. The anti-forgery structure 5 is scanned by the image-capturing unit 10 of the electronic operation device 1 after the product is purchased. Subsequently, data may be logged on the website by the user for the accreditation, registration or authorization of the product. If the accredited product is counterfeited by others afterwards, the customer purchasing the counterfeit and desiring for accreditation will be notified by the system that the product has been accredited, registered or authorized. The customer is then informed of the product being a counterfeit.

The advantage of lower cost is provided, due to simple structure of the disposable lens 2. Therefore, in the application to practical products, the biochemical sheet 4 or the anti-forgery structure 5 may be sold together with the disposable lens 2 in a bundle by developing manufacturers. Perhaps, the biochemical sheet 4, the anti-forgery structure 5 and the disposable lens 2 may be sold individually. The disposable lens 2 may be kept or discarded depending on the situation by the customer after recognition is completed. Different from the conventional optical image expansion instrument being bulky and hard to preserve, the disposable lens 2 is formed in a lightweight portable and thin shape with simple structure and low cost, without excessive conflict with preservation when it is used by the customer and without taking up much space when it is carried by the customer. As such, the customer may not be bothered in any case. Cost burden is also not resulted, even the disposable lens 2 is discarded. In the present invention, moreover, the fix adhesive 22 is provided to enable the customer to fix the disposable lens 2 to the electronic operation device 1 while align the lens 21 with the image-capturing unit 10 more conveniently and rapidly. Subsequently, the biochemical sheet 4 or the anti-forgery structure 5 are then recognized. Thereby, the effect of facilitating prerequisite is achieved.

Further, the electronic operation device 1 includes a database (not illustrated in figures) electrically connected to the application program. Thereby, the results calculated by the application program may be stored into the database for subsequent auxiliary applications, such as statistics, data analysis and connection to remote server, for example.

What is claimed is:

1. A disposable lens applied to an electronic operation device for recognition, comprising:
    a substrate implemented by a thin plastic sheet;
    a lens implemented by a cured polymer, said lens formed directly on one end of said substrate and protruding from a surface of said substrate, and corresponding to an image-capturing unit of said electronic operation device; and
    a fix adhesive connected with one side of said substrate so as to fix said substrate to said electronic operation device.

2. The disposable lens applied to an electronic operation device for recognition according to claim 1, wherein said substrate is provided between said image-capturing unit and said lens.

3. The disposable lens applied to an electronic operation device for recognition according to claim 1, further comprising a recognized unit with which said image-capturing unit is aligned through said lens.

4. The disposable lens applied to an electronic operation device for recognition according to claim 3, wherein said recognized unit is implemented as an anti-forgery structure, said anti-forgery structure comprising at least one micro-carving plate.

5. The disposable lens applied to an electronic operation device for recognition according to claim 4, wherein said anti-forgery structure comprises at least one one-dimensional barcode or at least one two-dimensional barcode.

6. The disposable lens applied to an electronic operation device for recognition according to claim 3, wherein said recognized unit is implemented as a biochemical sheet.

7. The disposable lens applied to an electronic operation device for recognition according to claim 6, wherein said biochemical sheet comprises a test area and a calibration area.

8. The disposable lens applied to an electronic operation device for recognition according to claim 7, wherein said calibration area comprises at least one comparison object and at least one focused target object.

9. The disposable lens applied to an electronic operation device for recognition according to claim 4, wherein said electronic operation device comprises a processor executing an application program that is electrically connected to said image-capturing unit.

* * * * *